(12) United States Patent
Kekre et al.

(10) Patent No.: US 7,191,299 B1
(45) Date of Patent: Mar. 13, 2007

(54) METHOD AND SYSTEM OF PROVIDING PERIODIC REPLICATION

(75) Inventors: Anand K. Kekre, Pune (IN); Ronald S. Karr, Palo Alto, CA (US); John A. Colgrove, Los Altos, CA (US); Kedar M. Karmarkar, Sunnyvale, CA (US); Raghu Krishnamurthy, Cupertino, CA (US); Saurabh R. Godbole, Pune (IN); Ming Xu, San Ramon, CA (US); Vikas K. Gupta, Santa Clara, CA (US); Deepak Tawri, Pune (IN)

(73) Assignee: Veritas Operating Corporation, Mountain View, CA (US)

( * ) Notice: Subject to any disclaimer, the term of this patent is extended or adjusted under 35 U.S.C. 154(b) by 341 days.

(21) Appl. No.: 10/436,354

(22) Filed: May 12, 2003

(51) Int. Cl.
*G06F 12/00* (2006.01)

(52) U.S. Cl. .................. 711/162; 711/161; 707/204

(58) Field of Classification Search .................. None
See application file for complete search history.

(56) References Cited

U.S. PATENT DOCUMENTS

| 6,889,228 B1* | 5/2005 | Federwisch .................. 707/102 |
| 2003/0167380 A1* | 9/2003 | Green et al. ................ 711/136 |

* cited by examiner

*Primary Examiner*—Hyung Sough
*Assistant Examiner*—Jasmine Song
(74) *Attorney, Agent, or Firm*—Campbell Stephenson Ascolese LLP (57) ABSTRACT

A method and system of providing periodic replication is disclosed. According to one embodiment, a method is provided which comprises creating a storage object corresponding to a data volume, wherein the storage object comprises a point-in-time copy of the data volume and a data volume map; and replicating the data volume utilizing the storage object.

17 Claims, 5 Drawing Sheets

METHOD AND SYSTEM OF PROVIDING PERIODIC REPLICATION

BACKGROUND

1. Technical Field

The present invention relates to data storage and retrieval generally and more particularly to a method and system of providing periodic replication.

2. Description of the Related Art

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication is one technique utilized to minimize data loss and improve the availability of data in which a replicated copy of data is distributed and stored at one or more remote sites or nodes. In the event of a site migration, failure of one or more physical disks storing data or of a node or host data processing system associated with such a disk, the remote replicated data copy may be utilized, ensuring data integrity and availability. Replication is frequently coupled with other high-availability techniques such as clustering to provide an extremely robust data storage solution.

Replication may be performed by hardware or software and at various levels within an enterprise (e.g., database transaction, file system, or block-level access) to reproduce data from a replication source volume or disk within a primary node (a primary volume) to a remote replication target volume or disk within a secondary node (a secondary volume). Replication may be synchronous, where write operations are transmitted to and acknowledged by one or more secondary node(s) before completing at the application level of a primary node, or asynchronous, in which write operations are performed at a primary node and persistently queued for forwarding to each secondary node as network bandwidth allows. The asynchronous mode of replication is the most complex form of replication due to the requirements of replication log management at the primary node and write ordering at the secondary node. Asynchronous replication requires writes to be ordered at the secondary node to ensure that the replicated volume is consistent. It also requires the writes to be ordered across a set of volumes if an application (e.g., a database) uses more than one volume at a time. Synchronous replication, while not requiring writes to be ordered suffers from sometimes significant I/O latency which depends on the characteristics of the network.

Figure 1:
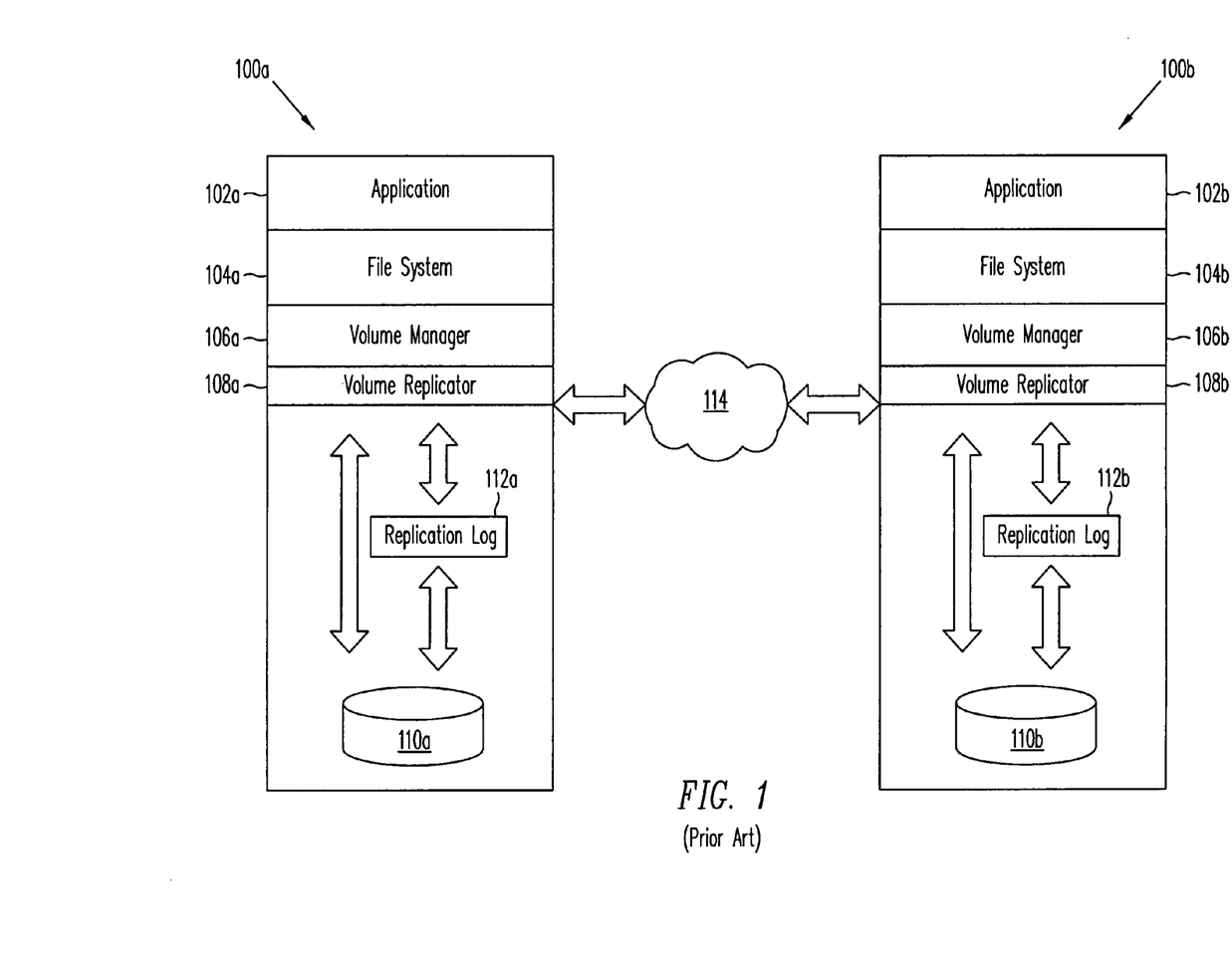
FIG. 1 illustrates a replication system block diagram according to the prior art.

FIG. 1 illustrates a replication system block diagram according to the prior art. Primary node 100a of the illustrated prior art embodiment includes an application 102a (e.g., a database, mail server, web server, etc.), a file system 104a, a volume manager 106a including a volume replicator 108a or other replication facility, a primary data volume 110a or "replication source volume", and a replication log 112a as shown. Volume replicator 108a of primary node 100a receives data (e.g., in conjunction with a write operation from application 102a, file system 104a, and/or volume manager 106a) to be stored within primary data volume 110a. Volume replicator 108a of primary node 100a then stores the received data within primary data volume 110a and transfers a replicated copy of the data at a block level to a corresponding volume replicator 108b within secondary node 100b over a network 114 (e.g., an IP network, LAN, WAN, or other communication link) coupled between primary node 100a and secondary node 100b.

When replicating synchronously, volume replicators 108 are used to maintain primary and secondary site data synchronization. A write request from application 102a to a synchronously replicated volume such as primary data volume 110a is considered complete as soon as the update is logged at the primary node 100a, and, transmitted to and acknowledged by all secondary sites (e.g., secondary node 100b). Each secondary site confirms an update or write operation in two stages. A first confirmation acknowledges receipt of the update. A second confirmation, indicating that the primary node need no longer keep the update in its replication log 112a, is sent when data is on disk at the secondary site. Data to be written primary data volume 110a is synchronously replicated by first writing it to replication log 112a. Thereafter the data may be concurrently written to disk storage associated with primary data volume 110a and transferred to secondary node 100b. Once the data has been received, secondary node 100b confirms its receipt to primary node 100a so that completion of the write operation may be signaled to the write-initiating application 102a and stores the data on disk storage associated with the secondary data volume 110b.

When replication is asynchronous, an application write completes as soon as volume replicator 108a has logged the update in replication log 112a. Transmission and writing to secondary data volume 110b is concurrent with continued execution of application 102a. Following transfer of data associated with a requested write operation to replication log 112a, completion of the write operation may be signaled to the write-initiating application 102a. Thereafter (or concurrently with the signaling of the write operation's completion) the data may be transferred to secondary node 100b. The data is then typically written to disk storage associated with primary data volume 110a followed by the storage of the data within replication log 112b, receipt confirmation by secondary node 100b to primary node 100a, the storage of the data on disk storage associated with the secondary data volume 110b, and an indication confirming the occurrence of the write to primary node 100a.

A given node can serve as a primary node/replication source volume for one application and as a secondary node/replication target volume for another application. Furthermore, for the same application program, a given node can serve as a secondary node at one point in time, and as a primary node at another point in time to "cascade" replication of the data to other nodes connected via communications links. For example, a first replication may be made between nodes in different cities or states, and a node in one of the cities or states can in turn act as the primary node in replicating the data worldwide. Each replication primary node may also have more than one replication secondary node. As used herein, a reference to the secondary node implicitly refers to all secondary nodes associated with a given primary node unless otherwise indicated as identical replication operations are typically performed on all secondary nodes.

SUMMARY OF THE INVENTION

Disclosed is a method and system of providing periodic replication. Embodiments of the present invention may be used to allow data of a data volume to be replicated between a primary node and secondary node within a storage system using a snappoint storage object.

According to one embodiment, a method is provided which comprises creating a storage object corresponding to a data volume, wherein the storage object comprises a point-in-time copy of the data volume and a data volume map; and replicating the data volume utilizing the storage object.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one alternate replication technique known as periodic replication, a secondary site is periodically updated with the changes that have been written to volumes of a primary site over a period of time, without having to maintain the order in which an application wrote the data. According to one embodiment of the present invention, a method and system of providing periodic replication is provided. According to another embodiment the described replication may be triggered or "initiated" by an external event such as an application request or the occurrence of a pre-defined number or volume of write operations on a primary data volume.

Figure 2:
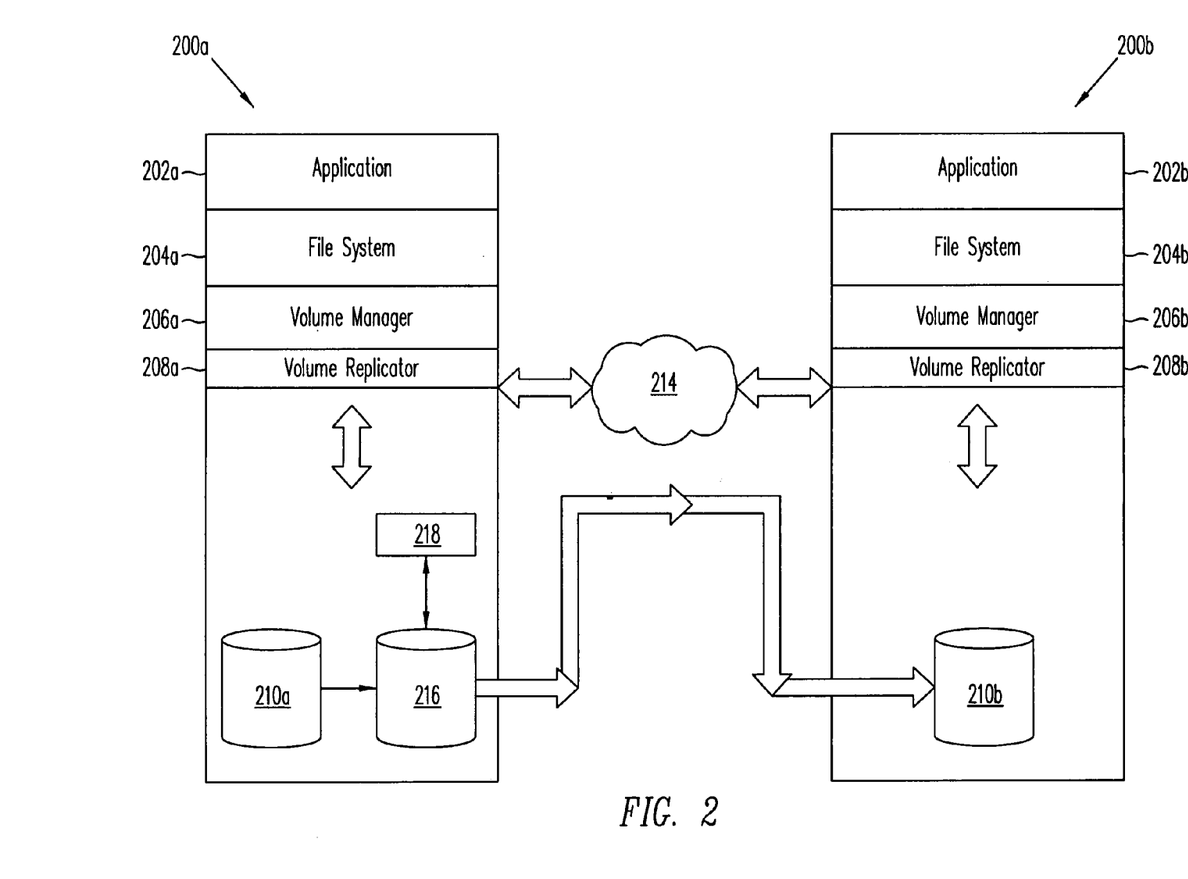
FIG. 2 illustrates an initial synchronization operation within a replication system environment according to an embodiment of the present invention.

FIG. 2 illustrates an initial synchronization operation within a replication system environment according to an embodiment of the present invention. In the replication system of the illustrated embodiment, a primary node 200a is coupled to a secondary node 200b via a network 214 (e.g., an IP network, LAN, WAN, or other communication link). The contents of a primary data volume (Vol) within primary node 200a are transferred to a replicated secondary data volume (R_Vol) within a secondary node 200b during initial synchronization. To maintain the accessibility of the primary data volume, a point-in-time "snapshot" volume (S_Vol) is created and the initial synchronization (as well as subsequent periodic replication) is performed using the snapshot volume. As the initial synchronization is being performed, updates (e.g., write operations or other changes) to the primary data volume are tracked for later use in performing periodic replication according to an embodiment of the present invention. Primary node 200a of the illustrated embodiment includes an application 202a, a file system 204a, a volume manager 206a including a volume replicator 208a or other replication facility, a primary data volume 210a, and a "snappoint" storage object including a point-in-time copy 216 or "snapshot" of said primary data volume 210a and a data volume map 218 (current).

A snapshot volume is a point-in-time copy of another volume (e.g., a primary data volume). A snapshot may be a virtual point-in-time copy or "instant snapshot" as more fully described in U.S. patent application Ser. No. 10/143,059 entitled, "Method and Apparatus for Creating a Virtual Data Copy," which is incorporated herein by reference and for all purposes or alternatively may be a complete (sometimes also referred to as "real" or "actual") point-in-time copy. Such instant snapshots may be space-optimized, such that only data modified in the base (e.g., primary) data volume or the snapshot itself is stored in the snapshot, or full-image, such that all data from a corresponding base volume is copied into the snapshot, potentially using a background process.

Unlike conventional "breakoff type" snapshots where a plex is required to be created and synchronized with the contents of the base or "source" volume, instant snapshots, which utilize the principle of copy-on-write, are available instantaneously and many snapshot operations (e.g., refresh, restore, reattach) appear instantaneous to the user. Previously, the restoration of an original volume from a conventional snapshot was a destructive operation in the sense the identity of snapshot was lost as a result of "snapback" operation. Another benefit of instant snapshots is that their associated restore operation preserves the snapshot's identity, at the same time making the original volume available for access. Instant snapshots may also afford a user a savings in storage space where space-optimized snapshots are used.

According to one embodiment, a volume can have up to 31 snapshots at a given time. The changes to the base volume with respect to each snapshot are tracked in the form of data volume maps called per-volume maps (PVM). Accordingly, instants snapshots may be created and organized with greater flexibility than traditional snapshots. Instant snapshots also facilitate multi-node support and the ability to create incremental images and extract changed regions between two or more images described herein in greater detail.

A snappoint storage object provides information about the changes to a volume with respect to a point in time image of that volume. Such snappoints give applications the ability to create incremental images of a volume, retrieve the information about the changed regions between any two images and extract the changed regions. According to one embodiment, snappoints are managed and controlled by a volume manager, such as the Volume Manager™ provided by Veritas Software Corporation of Mountain View Calif., and are persistent. In another embodiment, a snappoint may be one of two varieties, dataful, which preserve a point-in-time image of a volume using an instant snapshot and track changed regions using a PVM and dataless, which merely track changed regions using a PVM.

Secondary node 200b of the illustrated embodiment includes an application 202b, a file system 204b, a volume manager 206b including a volume replicator 208b or other replication facility, and a secondary data volume 210b. After the creation of the storage object including point-in-time copy 216, a subsequent write operation results in the copying of existing data impacted by the write from primary data volume 210a to point-in-time copy 216 and the modification of data volume map 218 to indicate the occurrence of the write and the modified regions of primary data volume 210a. Consequently, point-in-time copy 216 provides a consistent, stable volume which may be synchronized with secondary data volume 210b (e.g., by copying all the data from point-in-time copy 216 to secondary data volume 210b). The data volume map 218 indicating write operations as described may then be subsequently used to perform periodic replication.

According to an alternative embodiment of the present invention, the described initial synchronization is performed using tape backup and restore. In the described embodiment, a tape backup image or copy and a data volume map (current) are concurrently generated on a primary node. Thereafter, the tape backup is moved (either physically or via transfer across a network) to a secondary node and used to synchronize a "secondary" replication target volume.

Figure 3:
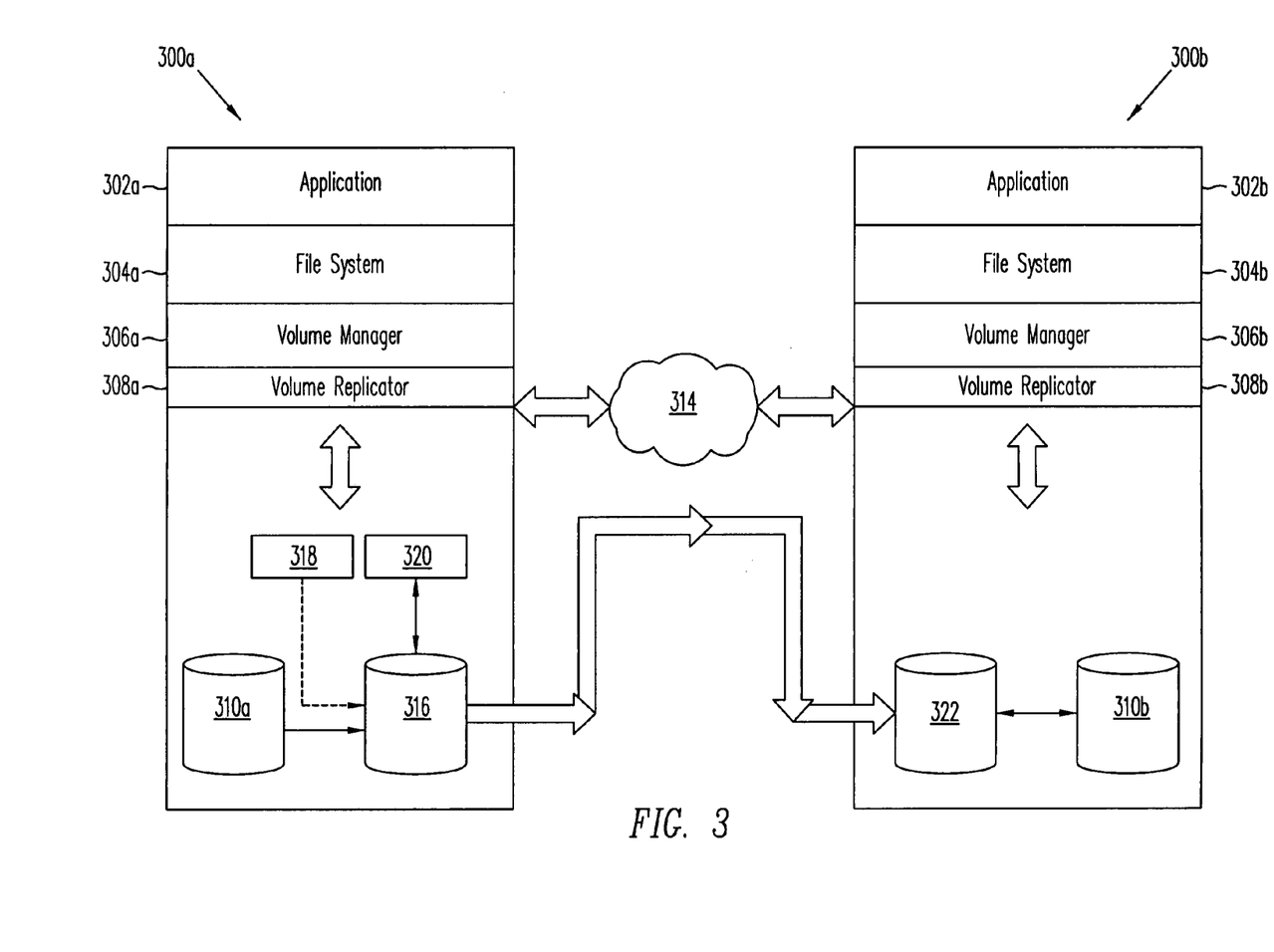
FIG. 3 illustrates a periodic replication operation within a replication system environment according to an embodiment of the present invention.

FIG. 3 illustrates a periodic replication operation within a replication system environment according to an embodiment of the present invention. In the illustrated embodiment, copies of incrementally modified or changed data of a primary data volume (Vol) within primary node 300a are transferred to a replicated secondary data volume (R_Vol) within a secondary node 300b periodically. To maintain the accessibility of the primary data volume, a point-in-time "snapshot" volume (S_Vol) is created and the periodic replication is performed using the snapshot volume. Similarly, to maintain the accessibility of the secondary data volume, a point-in-time "snapshot" volume (RS_Vol) is created and used at the secondary node 300b to receive incremental changes from the primary node 300a and to restore the replicated secondary data volume.

In the replication system of the illustrated embodiment, a primary node 300a is coupled to a secondary node 300b via a network 314 (e.g., an IP network, LAN, WAN, or other communication link). Primary node 300a and secondary node 300b of the illustrated embodiment each respectively includes an application 302, a file system 304, and a volume manager 306 including a volume replicator 308 as shown. Once the initial synchronization is completed as described with respect to FIG. 2, periodic replication may be performed. Primary node 300a further includes a primary data volume 310a, a point-in-time copy 316 of primary data volume 310a, a first data volume map 318 (current), and a second data volume map 320 (next). It should be readily appreciated that the labels (e.g., "current" and "next") are to some degree arbitrary and that the presence of labels as well as the particular labels depicted in the illustrated embodiment are not intended to limit the scope of the present invention.

Following initial synchronization as described with respect to FIG. 2, periodic replication is performed by first substantially simultaneously or atomically refreshing the point-in-time copy 316 of said primary data volume 310a as more fully described in U.S. patent application Ser. No. 10/326,427 entitled, "Instant Refresh of Data Volume Copy," which is incorporated herein by reference and for all purposes and creating a storage object including the refreshed point-in-time copy 316 and the second data volume map 320 (next). Thereafter, the first data volume map 318 (current) indicates or identifies regions within primary data volume 310a which were modified during initial synchronization (and subsequent to the creation of the storage object including the first data volume map 318) while the second data volume map 320 (next) of the newly created storage object snappoint is utilized to track or identify regions within primary data volume 310a which were modified following initial synchronization. Consequently, data associated with incremental changes (e.g., data of primary data volume 310a which was modified during initial synchronization) may be copied from point-in-time copy 316 using the first data volume map 318 (current) to a point-in-time copy 322 or "snapshot" volume on secondary node 300b and used to restore secondary data volume 310b. In another embodiment of the present invention, yet another point-in-time copy (not illustrated) of secondary node 300b is used to provide consistent read access while secondary node 300b is being periodically restored.

Figure 4A:
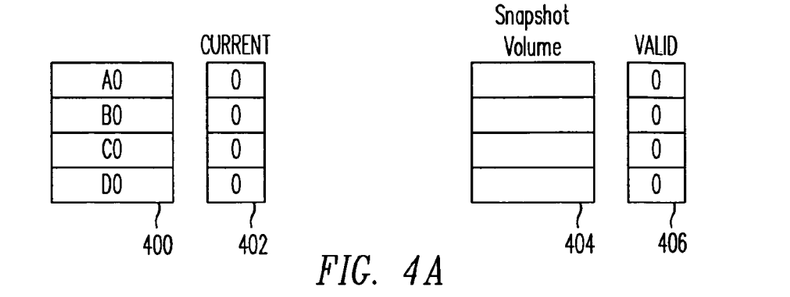
FIGS. 4a–4d illustrate storage objects utilized in an exemplary periodic replication process according to an embodiment of the present invention.

FIGS. 4a–4d illustrate storage objects utilized in an exemplary periodic replication process according to an embodiment of the present invention. FIG. 4a illustrates storage objects at a first time (e.g., T=0) including a primary data volume 400, a current data volume map 402, a snapshot volume 404 and a validation map 406. In the illustrated embodiment, primary data volume 400 stores data A0–D0, current data volume map 402, having a block corresponding to each region within primary data volume 400, indicates or identifies modified regions within primary data volume 400. Snapshot volume 404 serves as a copy-on-write, point-in-time copy of primary data volume 400. Validation map 406 indicates, having a block corresponding to each region within snapshot volume 404, indicates whether or not snapshot volume 404 contains valid data at each of its region locations.

According to one embodiment of the present invention a write operation directed to primary data volume 400 results in original data being copied from a region within primary data volume 400 to a corresponding region or location within snapshot volume 404 and further results in a bit value being modified (e.g., set to a value corresponding to a logical 'one') in corresponding locations or blocks within current data volume map 402 and validation map 406 to indicate that data within primary data volume 400 has been modified and that snapshot volume 404 consequently stores valid data, respectively.

Figure 4B:
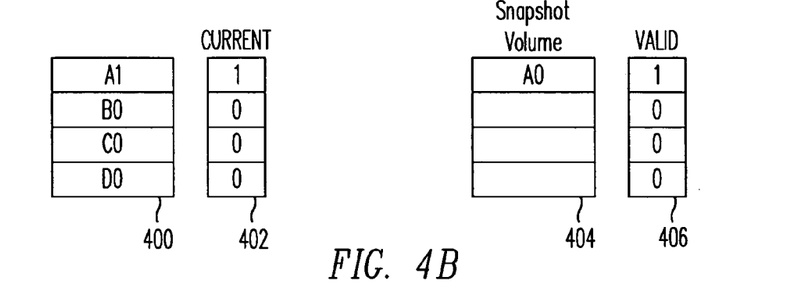

FIG. 4b illustrates storage objects at a second time (e.g., T=1) following a write operation such as that described with respect to FIG. 4a. The storage objects of FIG. 4b include a primary data volume 400, a current data volume map 402, a snapshot volume 404 and a validation map 406 as described with respect to FIG. 4a. At the time depicted by FIG. 4b, a write operation of data A1 has been performed on the first region of primary data volume 400 as shown. Consequently, the data previously stored within this first region of primary data volume 400 (A0) is transferred or copied into the corresponding first region of snapshot volume 404. Similarly, the first regions or positions within current data volume map 402 and validation map 406 are "set" to logical 'one' to indicate both that a write operation has been performed at the first region within primary data volume 400 and that the first region of snapshot volume 404 includes valid data.

According to one embodiment of the present invention, initial synchronization between snapshot volume 404 and a secondary data volume (not illustrated) may be performed at any time following the creation of a storage object comprising the current data volume map 402 and snapshot volume 404 (e.g., times illustrated by FIG. 4a or FIG. 4b). In the described synchronization, data is successively read from each region or position of snapshot volume 404. If no write operation has been performed to a corresponding location within primary data volume 400 (e.g., all positions in FIG. 4a) data is simply read through the snapshot volume 404 to the base primary data volume 400 and copied into or transferred to a secondary data volume.

Figure 4C:
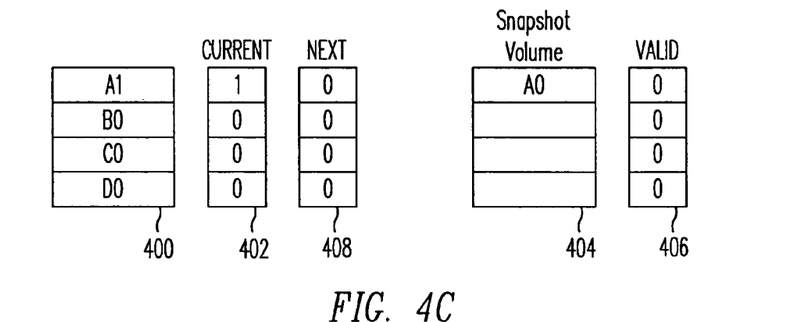

FIG. 4c illustrates storage objects at a third time (e.g., T=2) following the creation of a next data volume map 408 and prior to the occurrence of any additional write operations on primary data volume 400. The storage objects of FIG. 4c include a primary data volume 400, a current data volume map 402, a next data volume map 408, a snapshot volume 404 and a validation map 406. According to the embodiment illustrated in FIG. 4c, snapshot volume 404 is "refreshed" by resetting or "clearing" any previously set valid bits within validation map 406 to indicate the absence of valid data within snapshot volume 404 as more fully described in U.S. patent application Ser. No. 10/326,427 entitled, "Instant Refresh of Data Volume Copy" incorporated previously herein. In an alternative embodiment of the present invention, an additional snapshot volume (not illustrated) is created rather than refreshing existing snapshot volume 404. In the described embodiment validation map(s) are unnecessary and may be removed or omitted.

Figure 4D:
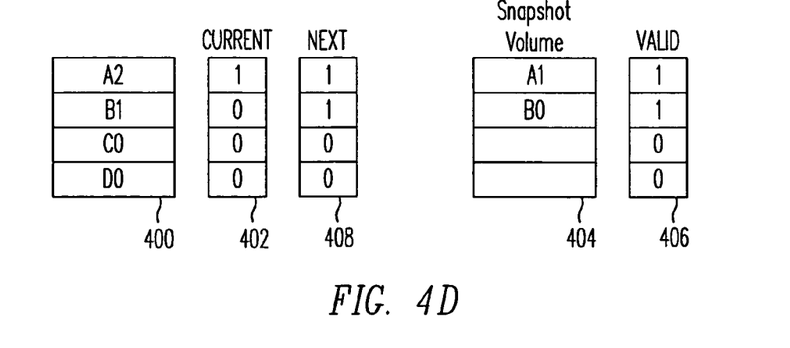

FIG. 4d illustrates storage objects at a fourth time (e.g., T=3) following the performance of write operations of data A2 and data B1 to the first and second regions of primary data volume 400 as shown. The storage objects of FIG. 4d include a primary data volume 400, a current data volume map 402, a next data volume map 408, a snapshot volume 404 and a validation map 406. In response to the described write operations, the data previously stored within this first and second regions of primary data volume 400 (A1 and B0, respectively) is transferred or copied into the corresponding first and second regions of snapshot volume 404. Similarly, the first and second regions or positions within next data volume map 408 and validation map 406 are "set" to logical 'one' to indicate both that a write operation has been performed and that the snapshot volume 404 includes valid data at the indicated positions. The current data volume map 402, unchanged, may be utilized to identify data (e.g., data A1) modified during a previous time period within snapshot volume 404 so that data may be periodically replicated according to one or more embodiments of the present invention.

According to one embodiment of the present invention, each region depicted (e.g., within primary data volume 400, snapshot volume 404, data volume maps 402, 408, and validation map 406) corresponds to a fixed amount of data within storage such as an individual block or a fixed number of bytes. Accordingly, entire regions are transferred or copied even in case the data change is less in size than the entire region. This may result in sending more data that what is actually required. To overcome this inefficiency in the data transfer we store associated extents (either persistently on disk or non-persistently/incore in RAM) in addition to setting a bit in bitmap as described herein. This extent information may then be used to send the exact data that was modified by the application.

Figure 5:
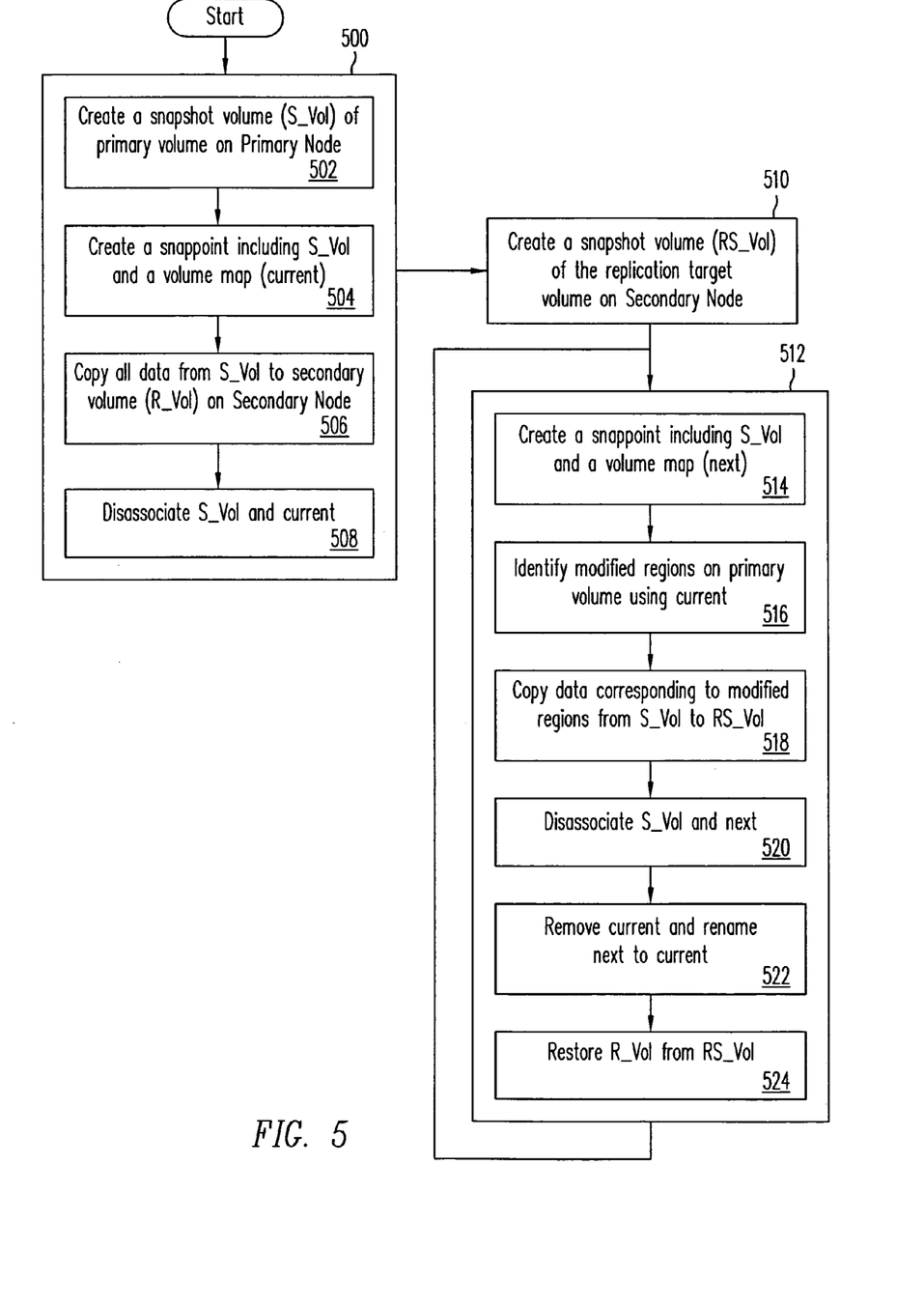
FIG. 5 illustrates a periodic replication process flow diagram according to an embodiment of the present invention.

FIG. 5 illustrates a periodic replication process flow diagram according to an embodiment of the present invention. The illustrated process begins with an initial synchronization subprocess (process block 500) in which a "point-in-time copy" snapshot volume, "S_Vol" of a primary data volume "Vol" is created on a primary node (process block 502), a snappoint storage object is created including S_Vol and a data volume map "current" (process block 504), and all data is copied from S_Vol to a secondary, replication target data volume "R_Vol" on a secondary node (process block 506) followed by the disassociation of the S_Vol snapshot and the current data volume map (process block 508). According to one embodiment, the described snappoint storage object is a dataful snappoint as described herein and the described disassociation of S_Vol and current includes a conversion of the snappoint storage object to a dataless snappoint.

Thereafter, another "point-in-time copy" snapshot volume, "RS_Vol" of the secondary data volume data volume "R_Vol" is created on the secondary node (process block 510) followed by a recurring periodic replication subprocess (process block 512). In the periodic replication subprocess of the illustrated embodiment, another storage object snappoint is created including the S_Vol snapshot volume and a data volume map "next" (process block 514). According to one embodiment, the creation of the described storage object snappoint results in the S_Vol snapshot volume being automatically refreshed as described herein. In other embodiments, S_Vol may be explicitly refreshed, or another point-in-time copy snapshot volume may be generated. After the new snappoint storage object has been created, modified regions of the primary data volume "Vol" are identified using the current data volume map (process block 516) and data corresponding to those modified regions is copied or transferred from the S_Vol snapshot volume on the primary node to the RS_Vol snapshot volume on the secondary node (process block 518). Once the appropriate data has been copied, the S_Vol snapshot is disassociated from the next data volume map (process block 520), the current data volume map may be removed (process block 522) or deleted, and the secondary replication target data volume R_Vol may be restored using the RS_Vol snapshot volume (process block 524). In the illustrated process embodiment, the periodic replication subprocess is then repeated indefinitely.

According to one embodiment of the present invention, a replicated secondary data volume provides a consistent image once the initial synchronization is complete. When the primary node crashes, failover to secondary and start using the replicated volumes (e.g., R_Vol) may be performed. At this point in the described embodiment, the point-in-time copy RS_Vol may be out of sync with respect to the replicated secondary data volume R_Vol by the regions that are marked in the data volume or per-volume map (PVM) of RS_VOL.

In the described embodiment, the secondary node will keep updating the PVM of RS_VOL as the data is transferred from S_VOL to RS_VOL during periodic replication. The bits in PVM of RS_VOL will be a subset of the current data volume map as the latter is being used to update RS_VOL from S_VOL. On the primary node, S_VOL will be out of sync with respect to the primary data volume by the regions that are marked in the next data volume map. Hence when the primary data volume crashed, it and the replicated secondary data volume were out of sync by the sum of the next and current data volume maps.

According to one embodiment, when a crash occurs at the primary node and a decision is made to failover to the secondary node an application can immediately start using the replicated secondary data volume as soon as a command (e.g., vxrvg makeprimary) to convert the secondary node to the primary node returns. Since RS_VOL was being replicated without considering the write order, it may not be in consistent state and hence its contents can straightaway be discarded. According to one embodiment, as part of a vxrvg makeprimary command, a dataless snappoint labeled "failback" will be created and RS_VOL will be disassociated from the snapshot hierarchy of R_VOL. RS_VOL can later be used to resynchronize the primary data volume from the replicated secondary data volume during an easy failback operation and later perform periodic replication when the old primary assumes the role of secondary. In the described embodiment, all the changes to RS_VOL will be tracked using the failback snappoint until that time.

According to another embodiment of the present invention, an easy failback operation is provided. Once the old primary comes back online, it can assume the role of secondary. The resynchronization will be performed in the described embodiment from RS_VOL to the primary data volume using the failback snappoint of the new primary node and snapoints current and next of the old primary node. The described easy failback operation may be performed according to one embodiment by: creating a dataful snappoint current of R_VOL using RS_VOL as a snapshot volume; creating a map on a new primary node as the sum of the failback data volume map on the new primary, the current data volume map on the old primary, and the next data volume map on the old primary node; using this generated map to read modified data from RS_VOL and to transfer the data to the primary data volume, and converting current to a dataless snappoint for the next incremental transfer. Once this resynchronization completes, the periodic replication can be done the same way as previously described.

In another embodiment of the present invention, a migration or takeover operation is provided. According to one embodiment the described migration requires that all the applications be closed on the existing primary and the old primary nodes be fully resynchronized. In another embodiment, all snappoints may be cleared as a part of migration process. Following migration, the existing primary node can resume the role of the secondary node and the periodic replication can continue.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future.

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   creating a storage object corresponding to a storage volume, wherein said storage object comprises a point-in-time copy of said storage volume and a storage volume map; and
   replicating said storage volume utilizing said storage object, wherein
      said creating a storage object comprises creating a first storage object corresponding to a first storage volume,
      said first storage object comprises a first point-in-time copy of said first storage volume and a first storage volume map,
      said replicating said storage volume comprises copying data from said first point-in-time copy of said first storage volume to a second storage volume, and
      said copying data from said first point-in-time copy comprises, synchronizing said first point-in-time copy of said first storage volume and said second storage volume.

2. The method of claim 1, wherein said replicating said storage volume comprises, periodically replicating said storage volume.

3. The method of claim 1, wherein said creating a storage object comprises,
   creating a storage object corresponding to said storage volume, wherein said storage object comprises a virtual point-in-time copy of said storage volume.

4. The method of claim 1, further comprising:
   identifying a first set of one or more modified regions of said first storage volume using said first storage volume map.

5. The method of claim 4, wherein said creating a storage object further comprises,
   creating a second storage object corresponding to said first storage volume in response to said copying.

6. The method of claim 5, wherein said creating a second storage object comprises,
   refreshing said first point-in-time copy of said first storage volume; and
   creating a second storage object corresponding to said first storage volume in response to said refreshing, wherein said second storage object comprises said first point-in-time copy of said first storage volume and a second storage volume map.

7. The method of claim 6, further comprising,
   identifying a second set of one or more modified regions of said first storage volume using said second storage volume map.

8. The method of claim 7, wherein said copying data from said first point-in-time copy comprises,
   copying data corresponding to said first set of one or more modified regions of said first storage volume from said first point-in-time copy of said first storage volume to said second storage volume using said first storage volume map.

9. The method of claim 5, wherein said creating a second storage object comprises,
   creating a second storage object corresponding to said first storage volume wherein said second storage object comprises a second point-in-time copy of said first storage volume and a second storage volume map.

10. The method of claim 9, further comprising,
    identifying a second set of one or more modified regions of said first storage volume using said second storage volume map.

11. The method of claim 10, wherein said copying data from said first point-in-time copy comprises,
    copying data corresponding to said first set of one or more modified regions of said first storage volume from said second point-in-time copy of said first storage volume to said second storage volume using said first storage volume map.

12. A method comprising:
    creating a storage object corresponding to a storage volume, wherein said storage object comprises a point-in-time copy of said storage volume and a storage volume map; and
    replicating said storage volume utilizing said storage object, wherein
       said creating a storage object comprises creating a first storage object corresponding to a first storage volume,
       said first storage object comprises a first point-in-time copy of said first storage volume and a first storage volume map,
       said replicating said storage volume comprises copying data from said first point-in-time copy of said first storage volume to a second storage volume, and
       said copying data from said first point-in-time copy comprises,
          copying data from said first point-in-time copy of said storage volume to a point-in-time copy of said second storage volume, and
          restoring said second storage volume using said point-in-time copy of said second storage volume.

13. A method comprising:
    creating a storage object corresponding to a storage volume, wherein said storage object comprises a point-in-time copy of said storage volume and a storage volume map;
    replicating said storage volume utilizing said storage object; and
    identifying a first set of one or more modified regions of said first storage volume using said first storage volume map, wherein
       said creating a storage object comprises creating a first storage object corresponding to a first storage volume,
       said first storage object comprises a first point-in-time copy of said first storage volume and a first storage volume map,
       said replicating said storage volume comprises copying data from said first point-in-time copy of said first storage volume to a second storage volume, and
       said identifying a first set of one or more modified regions comprises, storing an extent, wherein said extent comprises a reference to a modified region of said first set of one or more modified regions and a length.

14. A computer program product comprising:
    a first set of instructions, executable on a computer system, configured to create a storage object corresponding to a data volume, wherein said storage object comprises a point-in-time copy of said data volume and a data volume map;

a second set of instructions, executable on said computer system, configured to periodically replicate said data volume utilizing said storage object; and computer readable media, wherein said computer program product is encoded in said computer readable media wherein said first set of instructions comprises a first subset of instructions, executable on said computer system, configured to create a first storage object corresponding to a first storage volume, wherein said first storage object comprises a first point-in-time copy of said first storage volume and a first storage volume map, and said second set of instructions comprises a second subset of instructions, executable on said computer system, configured to copy data from said first point-in-time copy of said first storage volume to a second storage volume, wherein said second subset of instructions are configured to synchronize said first point-in-time copy of said first storage volume and said second storage volume.

15. The computer program product of claim 14, wherein said second subset of instructions are further configured to copy data from said first point-in-time copy of said storage volume to a point-in-time copy of said second storage volume, and restore said second storage volume using said point-in-time copy of said second storage volume.

16. A computer program product comprising:

a first set of instructions, executable on a computer system, configured to create a storage object corresponding to a storage volume, wherein said storage object comprises a point-in-time copy of said storage volume and a storage volume map;

a second set of instructions, executable on said computer system, configured to periodically replicate said storage volume utilizing said storage object;

computer readable media, wherein said computer program product is encoded in said computer readable media, and a third set of instructions, executable on said computer system, configured to identify a first set of one or more modified regions of said storage volume using said storage volume map, comprising a first subset of instructions, executable on said computer system, configured to store an extent, wherein said extent comprises a reference to a modified region of said first set of one or more modified regions and a length.

17. An apparatus comprising:

means for creating a storage object corresponding to a storage volume, wherein said storage object comprises a point-in-time copy of said storage volume and a storage volume map; and means for periodically replicating said storage volume utilizing said storage object, wherein said creating a storage object comprises creating a first storage object corresponding to a first storage volume, said first storage object comprises a first point-in-time copy of said first storage volume and a first storage volume map, said replicating said storage volume comprises copying data from said first point-in-time copy of said first storage volume to a second storage volume, and said copying data from said first point-in-time copy comprises, synchronizing said first point-in-time copy of said first storage volume and said second storage volume.

* * * * *

(12) INTER PARTES REVIEW CERTIFICATE (59th)
United States Patent
Kekre et al.

(10) Number: US 7,191,299 K1
(45) Certificate Issued: Mar. 12, 2015

(54) METHOD AND SYSTEM OF PROVIDING PERIODIC REPLICATION (75) Inventors: Anand A. Kekre; Ronald S. Karr; John A. Colgrove; Kedar M. Karmarkar; Ming Xu; Deepak Tawri; Vikas K. Gupta; Raghu Krishnamurthy; Saurabh R. Godbole (73) Assignee: Symantec Corporation

Trial Number:

IPR2013-00143 filed Feb. 13, 2013

Petitioner: Veeam Software Corporation

Patent Owner: Symantec Corporation

Inter Partes Review Certificate for:

Patent No.: 7,191,299
Issued: Mar. 13, 2007
Appl. No.: 10/436,354
Filed: May 12, 2003

The results of IPR2013-00143 are reflected in this inter partes review certificate under 35 U.S.C. 318(b).

INTER PARTES REVIEW CERTIFICATE
U.S. Patent 7,191,299 K1
Trial No. IPR2013-00143
Certificate Issued Mar. 12, 2015

AS A RESULT OF THE INTER PARTES REVIEW PROCEEDING, IT HAS BEEN DETERMINED THAT:

Claims 1, 2, 4, 5, 12, 14 and 15 are cancelled.

* * * * *